Figure 1:
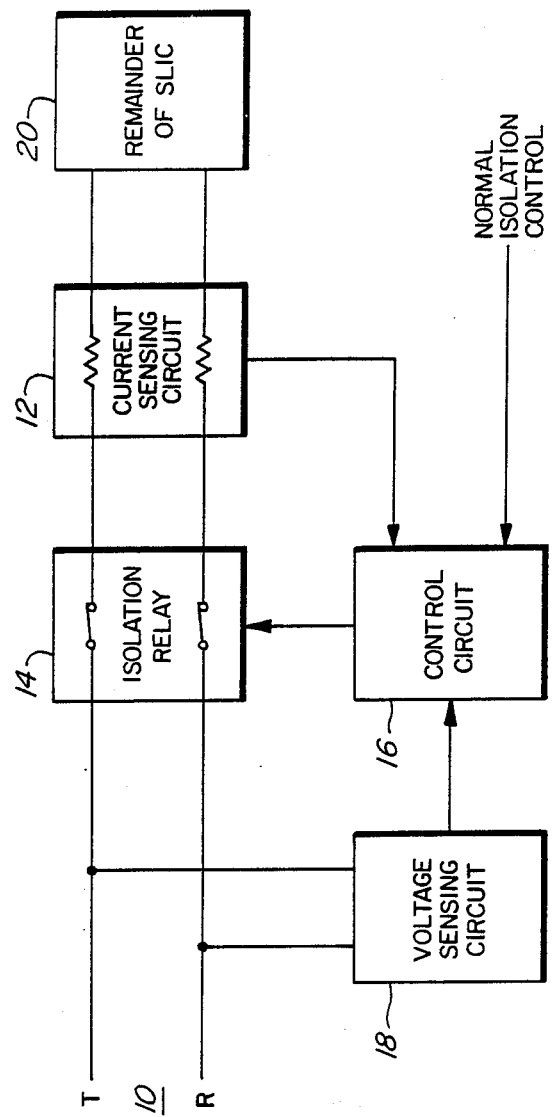

United States Patent [19]

Rosch et al.

[11] Patent Number: 4,947,427
[45] Date of Patent: Aug. 7, 1990

[54] PROTECTION ARRANGEMENT FOR A TELEPHONE SUBSCRIBER LINE INTERFACE CIRCUIT

[75] Inventors: Reinhard W. Rosch, Richmond; Stanley D. Rosenbaum, Ottawa, both of Canada

[73] Assignee: Northern Telecom Limited, Montreal, Canada

[21] Appl. No.: 423,501

[22] Filed: Oct. 12, 1989

Related U.S. Application Data

[63] Continuation of Ser. No. 60,190, Jun. 10, 1987, abandoned.

[51] Int. Cl.⁵ .......................... H02H 3/20; H04M 7/00
[52] U.S. Cl. ................................ 379/412; 361/102; 361/119; 361/56
[58] Field of Search ................... 361/56, 102, 91, 111, 361/57, 119, 118, 117; 379/387, 399, 398, 400, 405, 412, 413

[56] References Cited

U.S. PATENT DOCUMENTS

| | | | |
|---|---|---|---|
| 4,563,547 | 1/1986 | Booth | 379/399 X |
| 4,571,460 | 2/1986 | Rosenbaum et al. | 379/412 X |
| 4,585,905 | 4/1986 | Brown | 361/91 X |
| 4,618,743 | 10/1986 | Falater | 379/398 |
| 4,661,979 | 4/1987 | Jakab | 379/412 |
| 4,709,296 | 11/1987 | Hung et al. | 361/102 |
| 4,718,084 | 1/1988 | Dragotin | 379/412 |

FOREIGN PATENT DOCUMENTS 0086995 5/1985 Japan .................... 379/412

OTHER PUBLICATIONS

"AM 7950", Advanced Micro Devices, Jun. 1984 and Jun. 1985.
"Switching Device for Use in Limiting Voltage on Customer Lines", L. R. Card et al., Western Electric Technical Digest, No. 64, Oct. 1981, pp. 7-8.

*Primary Examiner*—Jin F. Ng
*Assistant Examiner*—Randall S. Vaas
*Attorney, Agent, or Firm*—Dallas F. Smith; R. John Haley

[57] ABSTRACT

A telephone subscriber line is connected to a SLIC via contacts of an isolation relay. Line voltage on the line side of the relay contacts, and line current on the SLIC side of the relay contacts, are detected during opposite polarity half-cycles of an a.c. fault on the line, and the contacts are opened to protect the SLIC if the voltage and/or current is excessive. The interruption of current causes the line voltage to rise to maintain the protection for the duration of a fault.

17 Claims, 2 Drawing Sheets

PROTECTION ARRANGEMENT FOR A TELEPHONE SUBSCRIBER LINE INTERFACE CIRCUIT

This application is a continuation of Ser. No. 060,190, filed on June 10, 1987, now abandoned.

This invention relates to a protection arrangement for a telephone subscriber line interface circuit, referred to below as a SLIC.

It is a well known requirement to protect a SLIC, which typically contains sensitive electronic components, from excessive voltages and currents which may occur on the line to which the SLIC is connected, for example due to power line crosses and induced alternating currents from power lines. It is desirable for the protection arrangement to provide full protection to the SLIC under all common fault conditions, to accommodate various normal operating conditions in which, for example, significant but not excessive currents are induced on the line, and to reset itself automatically when a fault condition is removed. In addition, because a protection arrangement is needed for each line, important commercial requirements are that it be of low cost and of small size.

Many forms of protection arrangement have been proposed. For example, it has long been known to use so-called heat coil protectors, in which resistive heating coils are connected in series in the subscriber line wires and an excessive current produces heating to melt a fusible link and thereby protect the SLIC connected to the line. Such protectors have disadvantages in that they add to the resistance in series with the subscriber line, they can not reset themselves after a fault but instead must be manually replaced, and they are slow to respond to faults so that battery feed resistors, also connected in series with the subscriber line wires, may have to dissipate a substantial amount of power in the event of a fault.

In order to overcome some of these disadvantages, Jakab U.S. Pat. No. 4,467,310 issued Aug. 21, 1984 and entitled "Telephone Subscriber Line Battery Feed Resistor Arrangements" describes an arrangement in which a switching type PTC thermistor is connected in series with and forms part of a battery feed resistor with which it is in close thermal contact. Whilst such an arrangement is effective, it has a relatively high cost because it requires the use of closely matched thermistors in order to provide the necessary very close matching of resistances in the subscriber line wires.

Other known protection arrangements, involving for example the use of fusible solder bridges, or triggerable thyristors, involve other combinations of disadvantages such as those outlined above, the need for additional components, involving extra cost, or being subject to undesired triggering for example due to spurious and transient subscriber line voltages and currents.

To overcome many of these disadvantages, in Hung et al. U.S. patent application No. 747,581 filed June 20, 1985 and entitled "Protection Arrangement for a Telephone Subscriber Line Interface Circuit" there is described a protection arrangement in which the contacts of an isolation relay, already provided for the purpose of isolating the SLIC from the subscriber line, are positioned between the battery feed resistors and the remainder of the SLIC, the isolation relay being controlled via a sensing circuit to open these contacts in the event of an excessive common mode alternating current passing through the feed resistors, the sensing circuit thereafter responding to subscriber line voltage for continued control of the isolation relay. Such an arrangement, however, has certain disadvantages in that the thresholds for protection from excessive currents and excessive voltages are not sufficiently independent of one another or of the nature of the fault (e.g. whether a fault condition applies to both wires or only one wire of the subscriber line), there is a risk of chattering of the isolation relay under some fault conditions, and there is a risk of a latched condition arising following operation of the isolation relay for conventional purposes.

Accordingly, an object of this invention is to provide an improved protection arrangement for a SLIC.

According to this invention there is provided a protection arrangement for a telephone subscriber line interface circuit connected to a telephone subscriber line, comprising: switching means; voltage sensing means; current sensing means; means for coupling the voltage sensing means to the line and for coupling the current sensing means to the line via the switching means, whereby the voltage sensing means is responsive to voltage on the line and the current sensing means is responsive, when the switching means is closed, to current on the line; and control means for closing the switching means in normal operation and for opening the switching means in response to an excessive voltage on the line determined by the voltage sensing means and/or an excessive current on the line determined by the current sensing means.

The invention is based on the recognition that either an excessive voltage or an excessive current, or both, may occur on the line and present a need for protection. This protection is provided by the opening of the switching means, but this interrupts the current. As a result of the interruption, and in particular the disconnection of the relatively low terminating impedance of the line typically provided by d.c. feed resistors of the SLIC, a relatively high impedance is presented to the SLIC end of the line so that voltage on the line due to a fault may rise sufficiently that it becomes an excessive voltage even if it was not excessive before the current interruption. Sensing of the voltage on the line continues after opening of the switching means, the excessive voltage then maintaining an open state of the switching means so that chattering is avoided.

Preferably the voltage and current sensing means comprise means for producing a voltage dependent upon the voltage and current, respectively, on the line, and the control means comprises integrating means responsive to the voltages and comparison means responsive to an output of the integrating means exceeding a predetermined threshold for opening the switching means. Conveniently the integrating means comprises a capacitor and the comparison means comprises a trigger circuit responsive to a voltage to which the capacitor is charged, and the control means comprises means for charging the capacitor when the voltage produced by the current sensing means exceeds a reference voltage.

Advantageously the switching means comprises contacts of an isolation relay which is typically already provided for the telephone subscriber line, and the control means is responsive to an isolation control signal for opening the switching means and discharging the capacitor. The discharging of the capacitor avoids a locked-up state occurring when the isolation control signal is removed, in the event that excessive voltages are present on the line while it is not properly terminated due to the open relay contacts. Such excessive voltages may be acceptable if, for example, they are due to induction from a power line and result in only a small, not excessive, line current when the relay contacts are closed and the line is properly terminated.

Similarly, the control means is preferably responsive to a ringing control signal for discharging the capacitor, to prevent high ringing voltages on the line from causing the switching means to be opened.

In a preferred embodiment of the invention, the voltage sensing means is responsive to only one polarity of voltage on the line and the current sensing means is responsive, when the switching means is closed, to only one polarity of current on the line, said one polarity of current corresponding to a voltage on the line of polarity opposite to said one polarity of voltage. This provides for simplicity and low cost in the design of the voltage and current sensing means, but ensures a prompt (within half a cycle of an a.c. waveform) opening of the switching means in the event that a major fault on the line causes both an excessive voltage and an excessive current.

The invention also extends to a method of protecting a telephone subscriber line interface circuit (SLIC) from excessive voltage and/or current on a telephone subscriber line to which the SLIC is connected, comprising the steps of: providing switching means between the SLIC and the line, the switching means being closed in normal operation to connect the SLIC to the line; sensing current on the line on the SLIC side of the switching means; sensing voltage on the line on the line side of the switching means; and opening the switching means in response to an excessive sensed current and/or voltage.

Figure 2:
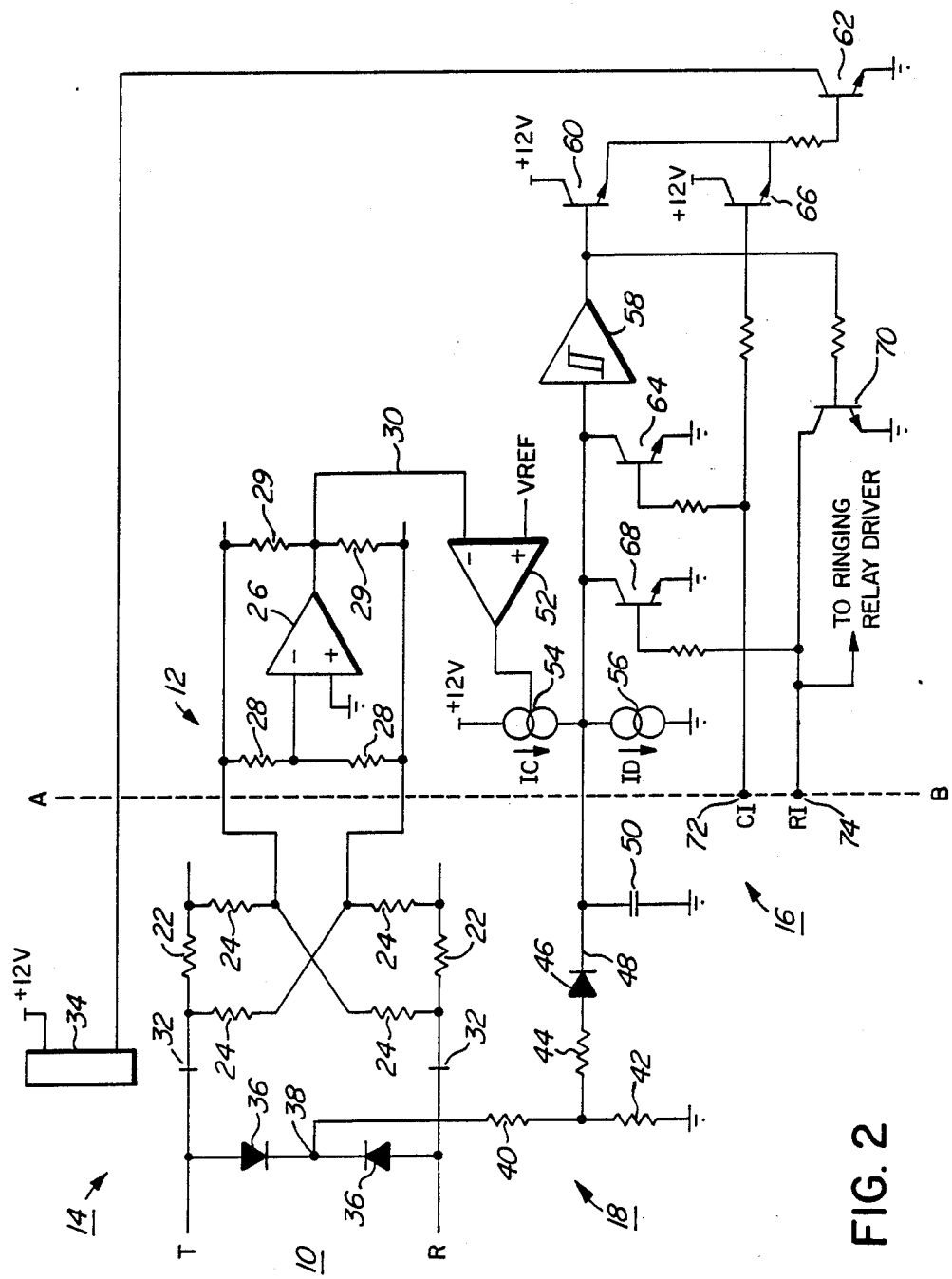

The invention will be further understood from the following description with reference to the accompanying drawings, in which:

FIG. 1 is a general functional block diagram of a SLIC and protection arrangement in accordance with an embodiment of the invention; and FIG. 2 is a circuit diagram schematically illustrating the arrangement of FIG. 1 in greater detail.

Referring to FIG. 1, a SLIC and protection arrangement is illustrated coupled to a 2-wire telephone subscriber line 10 comprising tip and ring wires T and R respectively. A current sensing circuit 12 is coupled to two closely matched battery feed resistors of the SLIC, which are coupled in series with the tip and ring wires via the contacts of an isolation relay 14. The isolation relay is conventionally provided for cut-over purposes, and to isolate the SLIC from the line 10 for example for testing purposes, in each case being controlled by software of a telephone switch to which the line 10 is connected via the SLIC. In addition, in accordance with this invention the relay 14 is also controlled by a control circuit 16 in dependence upon line currents, sensed by the current sensing circuit 12, on the SLIC side of the relay contacts, and in dependence upon line voltages, sensed by a voltage sensing circuit 18, on the line side of the relay contacts. The remaining parts of the SLIC, which can be of known form and with which the present invention is not concerned, are represented in FIG. 1 by a block 20.

Referring to FIG. 2, in which the line 10 and the components 12 to 18 are generally indicated by the same references as in FIG. 1, the protection arrangement and its operation will now be described in greater detail.

The current sensing circuit 12 in FIG. 2 comprises cross-connected potential dividers formed by resistors 24 coupled to the closely matched feed resistors 22, and a current summing d.c. amplifier, comprising an operational amplifier 26, input resistors 28, and feedback resistors 29, having an output line 30 on which there is produced a voltage representative of current through the feed resistors 22. The arrangement of the resistors 24 is known for example from Rosenbaum et al. U.S. Pat. No. 4,514,595 issued Apr. 30, 1985 and entitled "Active Impedance Line Feed Circuit".

The feed resistors 22 are coupled to the tip and ring wires T and R of the line 10 via the contacts 32 of the isolation relay 14, which also comprises a relay coil 34.

The voltage sensing circuit 18 comprises two diodes 36, each connected between a respective one of the tip and ring wires T and R and a junction point 38 and poled to be normally reverse biassed by the d.c. which is conventionally applied to the telephone subscriber line 10, a potential divider comprising resistors 40 and 42 connected between the junction point 38 and ground, and an optional resistor 44 and a diode 46 connected in series between the tapping point of the potential divider and an output line 48 of the voltage sensing circuit.

The control circuit 16 comprises a capacitor 50, a voltage comparator 52, a controlled current source 54, a current sink 56, a Schmitt trigger circuit 58, an NPN buffer transistor 60, and NPN transistors 62, 64, 66, 68, and 70 each including a current-limiting resistor (not referenced for the sake of clarity) in series with its base. In addition, the control circuit 16 includes input terminals 72 and 74 for control signals CI and RI respectively which are discussed further below. Components to the right of a broken line A-B shown in FIG. 2 may be conveniently provided with other parts of the SLIC, not shown in FIG. 2, in one or more integrated circuit devices.

The capacitor 50 is connected between the line 48 and ground, whereby it can be charged via the optional resistor 44 (which provides an increased charging time constant if desired) and the diode 46 from the potential divider of the voltage sensing circuit 18 during a positive half-cycle of an a.c. potential (or in the presence of a positive d.c. potential) on either or both wires of the subscriber line 10. The comparator 52 has an inverting input connected to the output line 30 of the current sensing circuit 12, a non-inverting input connected to a reference voltage VREF, and an output which controls the current source 54. During a negative half cycle of an alternating current passing through either or both of the feed resistors 22, if the peak current is sufficiently high that an overcurrent threshold established by the reference voltage VREF is crossed by the voltage on the output line 30 of the current sensing circuit, then the comparator 52 turns on the current source 54 to supply a constant current IC to the line 48 and hence to charge the capacitor 50.

The current sink 56 is connected between the line 48 and ground and passes a constant current ID to provide a slow discharge path for the capacitor 50. The line 48 is also connected to the input of the Schmitt trigger circuit 58, which is triggered in the event that the capacitor 50 is charged to a predetermined trigger voltage, thereby energizing the isolation relay coil 34, to open the contacts 32, via the buffer transistor 60 and the transistor 62 which acts as an isolation relay driver.

When the capacitor 50 has discharged to a lower threshold voltage, via the components 58, 60, and 62 the isolation relay coil 34 is de-energized and the contacts 32 are closed.

For software control of the isolation relay, the control signal CI can be applied to the terminal 72, rendering the transistors 64 and 66 coupled to this terminal conductive. The transistor 66 turns on the isolation relay driver transistor 62 to energize the isolation relay coil 34 as described above, and the transistor 64 discharges the capacitor 50. The discharging of the capacitor 50 inhibits operation of the protection arrangement while the control signal CI is present, and hence in the presence of high induced voltages which may occur on the line 10 in the absence of a proper line termination via the SLIC. This inhibition avoids a latched condition, in which the relay coil 34 would remain energized, when the control signal CI is terminated.

In a similar manner, the transistor 68 is turned on, to discharge the capacitor 50, by the control signal RI, which is applied to the terminal 74 to energize a ringing relay driver (not shown) to apply ringing voltages to the line 10. The ringing voltages could otherwise themselves cause the capacitor 50 to be charged sufficiently to trigger the Schmitt trigger circuit 58. In the event that the protection arrangement has already been triggered, then the transistor 70 is turned on to clamp the terminal 74 to ground, so that the ringing relay can not be energized in the presence of, and hence ringing equipment can not be damaged by, excessive voltages on the line 10.

From the above description, it should be appreciated that an excessive voltage and/or current on the line 10 results in charging of the capacitor 50, triggering of the circuit 58, and consequent opening of the contacts 32 thereby to protect the SLIC from the excessive voltage or current. For example, in the presence of an excessive alternating current on the line, during a negative half cycle the current source 54 is turned on, the capacitor 50 is charged, and the circuit 58 triggered to open the contacts 32 thereby interrupting the current. The opening of the contacts 32 removes the relatively low impedance termination of the line by the SLIC (the voltage sensing circuit potential divider has a high impedance), so that the line voltage rises and the charged state of the capacitor 50 is maintained during positive half cycles via the voltage sensing circuit. The threshold levels provided by the reference voltage VREF and the Schmitt trigger circuit 58, the division ratio of the potential divider in the voltage sensing circuit, and the rates of charging and discharging the capacitor 50 via the components 46, 54, and 56 can all be independently determined to provide for desired operating characteristics. In particular, the capacitor 50 may be conveniently charged with a time constant of about 3 ms and discharged with a time constant of about 200 ms to avoid chattering of the isolation relay at the frequency of the excessive current or voltage.

In the presence of an excessive alternating voltage, without an excessive current, on the line 10 the capacitor 50 is charged via the diode 46 during positive half cycles, whereby the isolation relay contacts 32 are opened as described above. In the event of a major fault condition, simultaneously causing both excessive alternating voltage and current on the line 10, the capacitor 50 will be charged, and the contacts 32 opened, via the diode 46 or the current source 54 within one half cycle, whereby rapid protection is achieved.

Although a particular embodiment of the invention has been described above, it should be appreciated that many changes may be made therein. For example, different forms of current and voltage sensing and trigger circuits may be used, and the capacitor 50 may be replaced by a different form of integrator or time delay circuit. In addition, the clamping transistors 64 and 68 may be replaced by constant current sinks, and if desired a zero crossing predictor could be provided, in the manner described in the Hung et al. application referred to above, in order to avoid any possibility of arcing at the relay contacts. Furthermore, although the use of the already-provided isolation relay is preferred, if desired a separate relay may instead be provided for the protection purposes as described above.

Numerous other modifications, variations, and adaptations may be made to the described embodiment without departing from the scope of this invention as defined in the claims.

What is claimed is:

1. A protection arrangement for a telephone subscriber line interface circuit connected via feed resistors to a telephone subscriber line, comprising:
   switching means for coupling the feed resistors to the line;
   voltage sensing means;
   current sensing means;
   means for coupling the voltage sensing means to the line and for coupling the current sensing means to the feed resistors, whereby the voltage sensing means is responsive to voltage on the line and the current sensing means is responsive, when the switching means is closed, to current on the line; and
   control means for closing the switching means in normal operation and for opening the switching means in response to a voltage on the line determined by the voltage sensing means to exceed a predetermined threshold and in response to a current on the line determined by the current sensing means to exceed a predetermined threshold.

2. An arrangement is claimed in claim 1 wherein the switching means comprises contacts of an isolation relay for the telephone subscriber line, and the control means is also responsive to an isolation control signal for opening the switching means.

3. An arrangement as claimed in claim 1 wherein the voltage and current sensing means comprise means for producing a voltage dependent upon the voltage and current, respectively, on the line, and the control means comprises integrating means responsive to the voltages and comparison means responsive to an output of the integrating means exceeding a predetermined threshold for opening the switching means.

4. An arrangement as claimed in claim 3 wherein the voltage sensing means is arranged to produce said voltage dependent on the voltage on the line in response to only one polarity of voltage on the line, and the current sensing means is arranged to produce, when the switching means is closed, said voltage dependent on the current on the line in response to only one polarity of current on the line, said one polarity of current corresponding to a voltage on the line of polarity opposite to said one polarity of voltage.

5. An arrangement as claimed in claim 3 wherein the integrating means comprises a capacitor and the comparison means comprises a trigger circuit responsive to a voltage to which the capacitor is charged.

6. An arrangement as claimed in claim 5 wherein the control means comprises means for charging the capacitor when the voltage produced by the current sensing means exceeds a reference voltage.

7. An arrangement as claimed in claim 5 wherein the switching means comprises contacts of an isolation relay for the telephone subscriber line, and the control means is responsive to an isolation control signal for opening the switching means and discharging the capacitor.

8. An arrangement as claimed in claim 5 wherein the control means is responsive to a ringing control signal for discharging the capacitor.

9. A method of protecting a telephone subscriber line interface (SLIC) circuit from excessive voltage and excessive current on a telephone subscriber line to which the SLIC is connected via feed resistors, comprising the steps of:
  providing switching means between the feed resistors and the line, the switching means being closed in normal operation to connect the SLIC via the feed resistors to the line;
  sensing current through the feed resistors;
  sensing voltage on the line on the line side of the switching means; and
  opening the switching means in response to a sensed current exceeding a predetermined threshold and in response to a sensed voltage exceeding a predetermined threshold.

10. Apparatus comprising a telephone subscriber line interface circuit (SLIC) and a telephone subscriber line coupled thereto, the apparatus including:
  voltage sensing means coupled to the line for sensing an excessive voltage on the line;
  switching means coupled in series with the line;
  feed resistors coupled in series with the line between the switching means and the SLIC;
  current sensing means coupled to the feed resistors for sensing an excessive current on the line in a closed state of the switching means; and
  control means responsive to the voltage sensing means sensing a voltage on the line exceeding a predetermined threshold and responsive to the current sensing means sensing a current on the line exceeding a predetermined threshold for opening the switching means.

11. Apparatus as claimed in claim 10 wherein the switching means comprises contacts of an isolation relay for the telephone subscriber line, and the control means is also responsive to an isolation control signal for opening the switching means.

12. Apparatus as claimed in claim 10 wherein the voltage and current sensing means comprise means for producing a voltage dependent upon the voltage and current, respectively, on the line, and the control means comprises integrating means responsive to the voltages produced by the voltage and current sensing means and comparison means responsive to an output of the integrating means exceeding a predetermined threshold for opening the switching means.

13. Apparatus as claimed in claim 12 wherein the voltage sensing means is arranged to produce said voltage dependent on the voltage on the line in response to only one polarity of voltage on the line, and the current sensing means is arranged to produce, when the switching means is closed, said voltage dependent on the current on the line in response to only one polarity of current on the line, said one polarity of current corresponding to a voltage on the line of polarity opposite to said one polarity of voltage.

14. Apparatus as claimed in claim 12 wherein the integrating means comprises a capacitor and the comparison means comprises a trigger circuit responsive to a voltage to which the capacitor is charged.

15. Apparatus as claimed in claim 14 wherein the control means comprises means for charging the capacitor when the voltage produced by the current sensing means exceeds a reference voltage.

16. Apparatus as claimed in claim 14 wherein the switching means comprises contacts of an isolation relay for the telephone subscriber line, and the control means is responsive to an isolation control signal for opening the switching means and discharging the capacitor.

17. Apparatus as claimed in claim 14 wherein the control means is responsive to a ringing control signal for discharging the capacitor.

* * * * *